June 28, 1932. T. H. STOUGH 1,865,342
COOKING PAN
Filed March 31, 1932
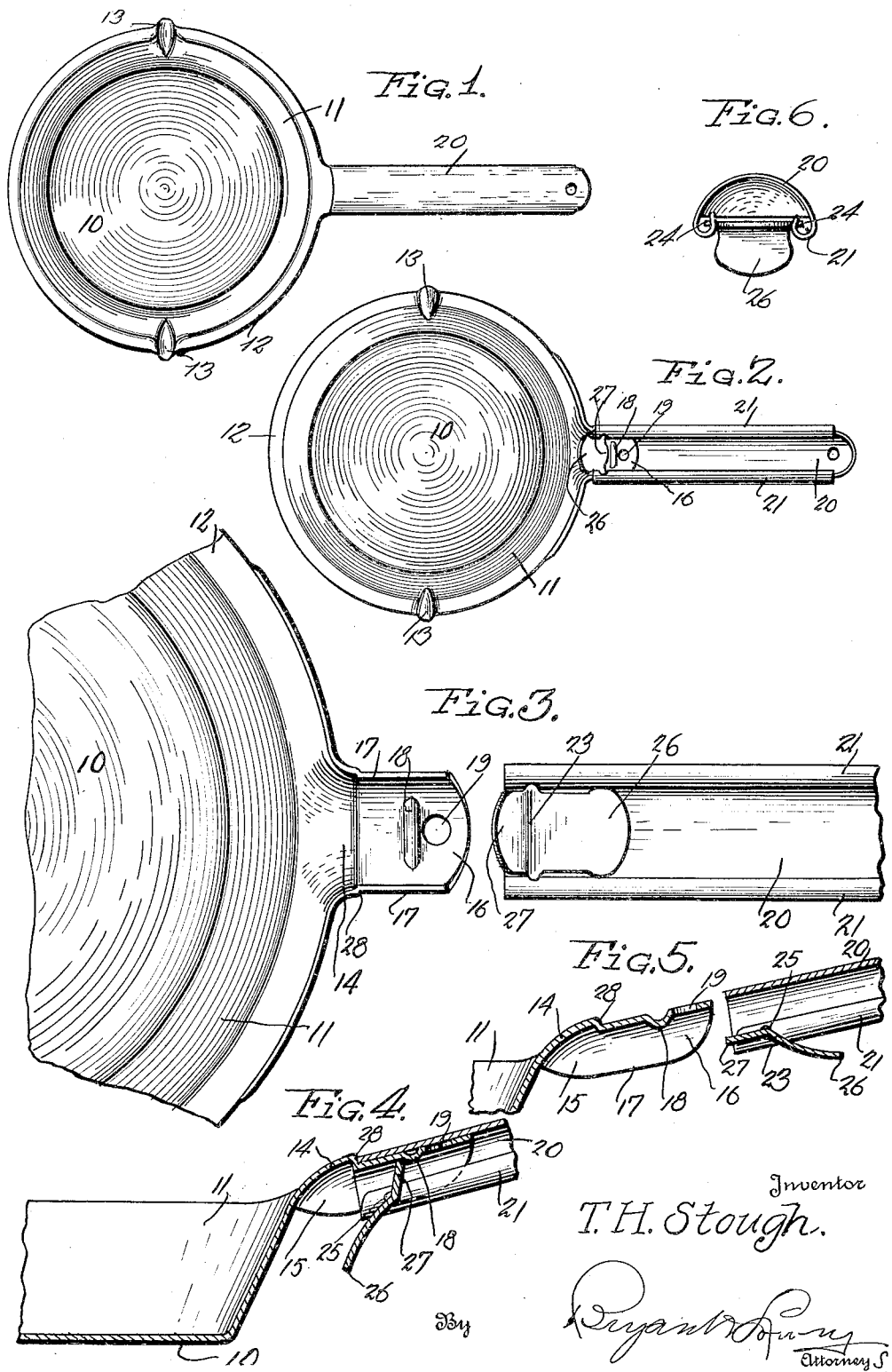

Patented June 28, 1932

1,865,342

UNITED STATES PATENT OFFICE

TURNEY H. STOUGH, OF JEANNETTE, PENNSYLVANIA, ASSIGNOR TO JEANNETTE STEEL CORPORATION, OF JEANNETTE, PENNSYLVANIA

COOKING PAN

Application filed March 31, 1932. Serial No. 602,341.

This invention relates to certain new and useful improvements in cooking pans.

The primary object of the invention is to provide a cooking pan capable of use as a spider or skillet and an individual pie pan, the pan being of a design or shape to facilitate its use as a pie pan and constructed for the detachable mounting of a handle to adapt the pan for use as a spider or skillet.

A further object of the invention is to provide a cooking pan of the foregoing character wherein the pan body carries an edge projecting lip or flange for the detachable reception of a handle securely retained in engagement with the pan lip by means of a pivoted clamp or lever to permit ready disengagement of the handle from the pan.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of a cooking pan constructed in accordance with the present invention showing the handle engaged with the pan body;

Figure 2 is a bottom plan view of the assembled cooking pan and handle showing the pivoted clamp or lever for securing the handle to the pan body;

Figure 3 fragmentarily illustrates bottom views of the pan body and handle disengaged from each other, showing the retaining ridge or rib on the pan lip to be engaged by the pivoted clamp on the handle;

Figure 4 is a detail sectional view showing the pivoted clamp carried by the handle in engagement with the rib on the pan lip;

Figure 5 is a detail sectional view showing the handle disengaged from the pan lip; and Figure 6 is an end elevational view of the handle.

Referring more in detail to the accompanying drawing, there is illustrated a combination spider or skillet and an individual pie pan with a handle detachably engaged therewith, the pan comprising a bottom wall 10 and an outwardly flaring side wall 11, the pan being of circular formation with the side wall 11 thereof of a height whereby the pan may be used as an individual pie pan or the like. The upper edge of the flaring side wall 11 is flanged outwardly as at 12 and opposite sides thereof are lipped as at 13 forming guide grooves for right or left hand use.

A handle is detachably engaged with the pan and is attached thereto when it is desired to use the same as a spider or skillet and to accommodate the mounting of the handle and to strengthen the pan at the points of attachment thereto of the handle, the flange 12 at one side edge of the pan intermediate the lips 13 is arched upwardly as at 14 providing side reinforcing flanges 15, the portions 14 and 15 carrying an outwardly directed transversely arched lip 16 having straight lower side edges 17. The tongue 16 intermediate its ends carries a depressed transversely extending rib 18 lying within the arched portion of the lip and said lip outwardly of the rib 18 is provided with an opening 19 whereby the pan may be hung upon a hook support or the like when the handle is disengaged therefrom. The transversely extending rib 18 forms a part of the lock device for retaining the handle engaged with the lip and pan and the specific function thereof will now appear.

The handle, preferably formed from sheet metal and designated by the reference numeral 20 is transversely arched throughout the length thereof with the longitudinal edges thereof rolled inwardly as at 21, one end of the handle 20 being telescopically mounted upon the pan lip 16 with the straight edges 17 of the pan lip received within the rolled edges 21 of the handle. A pivoted clamp 23 in the form of a plate carries side edge pins 24 that are pivotally mounted in openings 25 formed in the rolled edges 21 at one end of the handle 20, the clamp plate being of a width for free pivotal movement between the rolled edges of the handle. The end 26 of the clamp plate forms a finger grip while the other end 27 of the plate at the opposite side of the pivot pins 24 is disposed at an angle to the finger grip 26 and constitutes a clamping toe engageable with the rib 18.

When the handle 20 is to be engaged with the lip 16 of the pan, the clamp plate 23 is positioned as illustrated in Figures 3 and 5, the handle then being moved into telescopic engagement with the pan lip with the edges of the lip received in the rolled edges 21 of the handle. The mounting movement of the handle upon the lip is limited by the end of the handle moving into engagement with the shoulder 28 at the point of connection between the arched portion 14 of the pan flange 12 and the lip 16, as clearly shown in Figures 4 and 5. When the handle has been thus engaged with the pan lip, the clamp plate 23 is then moved upon its pivot pins 24 by engaging the finger grip 26 to move the same out of the arched handle 20 and toward the adjacent side wall 11 of the pan, this movement causing the clamping toe 27 of the clamping plate to frictionally wipe over the adjacent portion of the inner face of the handle and be limited in such movement by engaging the transverse rib 18 upon the underside of the lip 16 and when the clamping toe is so engaged with the rib 18, the clamping lever has been moved beyond a dead center so that the same remains immovable with the handle securely and rigidly attached to the lip of the pan. To remove the handle from the pan when it is desired to use the latter as an individual pie pan, the finger grip 26 of the clamping plate is moved in the opposite direction to disengage the clamping toe from the lip rib and adjacent handle portion whereupon the handle is disengaged from the lip.

From the above detailed description of the invention, it is believed that the construction and operation thereof will at once be apparent, and while there is herein shown and described the preferred embodiment of the invention it is nevertheless to be understood that minor changes may be made therein without departing from the spirit and scope of the invention as claimed.

I claim:—

1. In a detachable handle for cooking pans, wherein the pan carries an edge projecting lip, a handle engageable with the lip, a pivoted clamp carried by the handle and engageable with the lip for retaining the handle engaged with the lip, said lip and handle being transversely arched with the edges of the handle rolled inwardly to telescopically receive the lip, and said clamp having side pins pivoted in the rolled edges of the handle.

2. In a detachable handle for cooking pans, wherein the pan carries an edge projecting lip, a handle engageable with the lip, a pivoted clamp carried by the handle and engageable with the lip for retaining the handle engaged with the lip, said lip and handle being transversely arched with the edges of the handle rolled inwardly to telescopically receive the lip, said clamp having side pins pivoted in the rolled edges of the handle, the clamp including a finger grip and a clamping toe and a cross rib on the lip to be engaged by the clamping toe.

3. In a detachable handle for cooking pans, wherein the pan carries an edge projecting lip, a handle telescopically engageable with the lip, a pivoted clamp carried by the handle and including a finger grip and a clamping toe with the clamping toe adapted to be moved in frictional contact with the lip when swung into binding engagement with the lip and with the point of contact between the clamping toe and lip located between the clamp pivot and outer end of the handle.

4. In a detachable handle for cooking pans, wherein the pan carries an edge projecting lip, a handle telescopically engageable with the lip, a pivoted clamp carried by the handle and including a finger grip and a clamping toe with the free edge of the clamping toe adapted to be moved in frictional contact with the lip when swung into binding engagement with the lip and a cross rib on the lip between the clamp pivot and outer end of the handle to limit pivotal movement in a clamping direction of the clamping toe.

5. In a detachable handle for cooking pans, wherein the pan carries an edge projecting lip, a handle telescopically engageable with the lip, and being transversely arched, an angle clamp including a finger grip and a clamping toe pivotally mounted at the angle portion thereof within the arched handle with the clamping toe spaced from the lip during attachment of the handle to the lip, and said clamp being movable upon its pivot to cause the toe thereof to wipe over the surface of the lip in frictional binding engagement therewith and to assume a clamping position between the clamp pivot and the outer end of the handle.

6. In a detachable handle for cooking pans, wherein the pan carries an edge projecting lip, a handle telescopically engageable with the lip and being transversely arched, an angle clamp including a finger grip and a clamping toe pivotally mounted at the angle portion thereof within the arched handle with the clamping toe spaced from the lip during attachment of the handle to the lip, and said clamp being movable upon its pivot to cause the toe thereof to frictionally wipe over the surface of the lip with the free edge of the clamping toe moved beyond the dead center of the pivot to clamping position.

7. In a detachable handle for cooking pans, wherein the pan carries an edge projecting lip, a handle telescopically engageable with the lip and being transversely arched, an angle clamp including a finger grip and a clamping toe pivotally mounted at the angle portion thereof within the arched handle with the clamping toe spaced from the lip during attachment of the handle to the lip, and said clamp being movable upon its pivot to cause the toe thereof to frictionally wipe over the surface of the lip with the free edge of the clamping toe moved beyond the dead center of the pivot to clamping position, and an abutment on the lip beyond the dead center of the clamp pivot to be engaged by the toe to limit movement thereof.

In testimony whereof I affix my signature.

TURNEY H. STOUGH.